US011657839B2

(12) United States Patent
Horiuchi et al.

(10) Patent No.: US 11,657,839 B2
(45) Date of Patent: May 23, 2023

(54) DISK DEVICE FLEXURE PREVENTING MIGRATION OF ADHESIVE FROM A TERMINAL THEREOF

(71) Applicant: NHK SPRING CO., LTD., Yokohama (JP)

(72) Inventors: Takashi Horiuchi, Yokohama (JP); Takahiro Namura, Yokohama (JP); Yuto Sudo, Yokohama (JP); Yukie Yamada, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 17/840,521

(22) Filed: Jun. 14, 2022

(65) Prior Publication Data

US 2022/0406334 A1    Dec. 22, 2022

(30) Foreign Application Priority Data

Jun. 18, 2021 (JP) .............................. JP2021-101655

(51) Int. Cl.
*G11B 5/48*    (2006.01)
(52) U.S. Cl.
CPC .................. *G11B 5/4833* (2013.01)
(58) Field of Classification Search
None
See application file for complete search history.

(56) References Cited

U.S. PATENT DOCUMENTS

| 5,880,908 | A | * | 3/1999 | Shiraishi | G11B 5/4826 |
| | | | | | 360/234.6 |
| 6,154,343 | A | * | 11/2000 | Khan | G11B 5/4853 |
| | | | | | 360/245.9 |
| 6,700,746 | B1 | * | 3/2004 | Brandt | G11B 5/4826 |
| 8,570,688 | B1 | * | 10/2013 | Hahn | G11B 5/4873 |
| | | | | | 360/244.5 |
| 8,792,214 | B1 | * | 7/2014 | Bjorstrom | G11B 5/486 |
| | | | | | 360/245.8 |
| 8,810,972 | B1 | * | 8/2014 | Dunn | G11B 5/4873 |
| | | | | | 360/294.4 |
| 9,105,288 | B1 | * | 8/2015 | Hahn | G11B 5/4853 |
| 9,218,834 | B2 | * | 12/2015 | Imai | G11B 5/4873 |
| 9,251,817 | B1 | * | 2/2016 | Hahn | G11B 5/483 |
| 9,311,938 | B1 | * | 4/2016 | Ee | G11B 5/4826 |
| 9,330,696 | B1 | * | 5/2016 | Hahn | G11B 5/4873 |
| 9,679,593 | B2 | * | 6/2017 | Berscheit | G11B 5/4846 |

(Continued)

FOREIGN PATENT DOCUMENTS

JP    2019046517 A    3/2019
JP    2020135906 A    8/2020

*Primary Examiner* — Brian E Miller
(74) *Attorney, Agent, or Firm* — Holtz, Holtz & Volek PC

(57) ABSTRACT

A flexure includes a metal base, a base insulation layer formed on the metal base, a terminal formed on the base insulation layer, a conductor portion electrically conductive to the terminal and an detouring extending portion formed on the conductor portion. The conductor portion includes a conductor and a cover layer covering the conductor. A conductive adhesive is supplied to the terminal. The detouring extending portion is formed in a longitudinal middle of the conductor portion and extends from the side surface of the conductor portion in a direction intersecting the length direction of the conductor portion along the base insulation layer.

10 Claims, 9 Drawing Sheets

(56) References Cited

U.S. PATENT DOCUMENTS

| | | | | |
|---|---|---|---|---|
| 10,566,016 B2* | 2/2020 | Yamada | ............... | G11B 21/21 |
| 2008/0094756 A1* | 4/2008 | Makino | ............... | G11B 5/4826 |
| | | | | 360/245.9 |
| 2010/0246067 A1* | 9/2010 | Fujimoto | ............ | G11B 5/4873 |
| 2010/0246071 A1* | 9/2010 | Nojima | ............... | G11B 5/4833 |
| 2014/0022674 A1* | 1/2014 | Takikawa | ............... | G11B 5/483 |
| | | | | 360/244.5 |
| 2014/0085755 A1* | 3/2014 | Hanya | ................... | G11B 5/483 |
| | | | | 360/244.5 |
| 2015/0213818 A1* | 7/2015 | Imai | .................... | G11B 5/4873 |
| | | | | 29/25.35 |
| 2015/0348577 A1* | 12/2015 | Hagiya | ................ | H01L 41/042 |
| | | | | 29/25.35 |
| 2016/0086625 A1* | 3/2016 | Berscheit | ............. | G11B 5/483 |
| | | | | 360/294.4 |
| 2018/0336922 A1* | 11/2018 | Yamada | .................... | H05K 1/05 |
| 2019/0066720 A1* | 2/2019 | Yamada | ............... | G11B 5/4833 |
| 2019/0108853 A1* | 4/2019 | Yamada | ............... | G11B 5/4833 |
| 2020/0265866 A1 | 8/2020 | Suzuki | | |
| 2020/0286511 A1* | 9/2020 | Nesori | ............... | H01L 41/0472 |
| 2021/0287700 A1* | 9/2021 | Nesori | ............... | G11B 5/4826 |
| 2022/0406334 A1* | 12/2022 | Horiuchi | ............. | G11B 5/4833 |

* cited by examiner

DISK DEVICE FLEXURE PREVENTING MIGRATION OF ADHESIVE FROM A TERMINAL THEREOF

CROSS-REFERENCE TO RELATED APPLICATIONS

This application is based upon and claims the benefit of priority from the prior Japanese Patent Application No. 2021-101655, filed Jun. 18, 2021, the entire contents of which are incorporated herein by reference.

BACKGROUND OF THE INVENTION

1. Field of the Invention

The present invention relates to a disk device used in information processing devices and the like, in particular, to a wiring portion of a flexure of a disk device.

2. Description of the Related Art

In some case, on a flexure of a suspension used in a disk device, an actuator made of a piezoelectric element is mounted. JP 2020-135906 A (Patent Literature 1) describes an example of the flexure with an actuator. In order to secure the actuator to a gimbal portion of the flexure, a conductive adhesive may be used. The conductive adhesive contains a conductive material such as silver particles. The conductive adhesive has a function of securing the actuator to a terminal of the gimbal portion and a functions of electrically connecting the actuator to the wiring portion.

A liquid conductive adhesive before curing has fluidity. Therefore, part of the conductive adhesive may flow out from the terminal towards the wiring portion. The wiring portion of a flexure includes a conductor parallel portion comprising a plurality of conductor portions. Such a conductor parallel portion includes a narrow gap formed between each adjacent pair of conductor portions. The cap extends in the length direction of the conductor portions.

The conductive adhesive is supplied to the terminals of the actuator mounting portion. There have been some cases observed where the liquid conductive adhesive supplied to the terminals migrates through conductor portions to locations other than the terminals. For example, in the conductor parallel portion described above, there is a narrow gap between each adjacent pair of conductor portions. Due to such a structure, there are apprehensions that the conductive adhesive may be carried far by capillary action.

The conductive adhesive contains a conductive material such as silver particles. The conductive material migrating along conductive portions may adhere to unexpected locations. Further, the conductive material (conductive particles) adhering to unexpected locations may be detached from the wiring portion for some reason. The conductive material detached from the wiring portion may cause a malfunction in an electric circuit of the disk device or cause the disk device to crash. Therefore, it is necessary to avoid the liquid conductive adhesive from moving through the wiring portion.

JP 2019-046517 A (Patent Literature 2) discloses a flexure comprising a wall portion to prevent the liquid conductive adhesive from migrating. The wall portion prevents the conductive adhesive from moving toward the parts to be protected for example, the reference hole). The liquid conductive adhesive is supplied to the terminals of the actuator mounting portion. The wall portion is formed as an island-shaped convex portion between the terminals and the parts to be protected. Note that the height of the wall portion is greater than the height of the terminals.

The wall portion prevents the liquid conductive adhesive from flowing toward the parts to be protected. However, conventional wall portions have such structure of island-shaped convex portions that are independent of the wiring portion. The wall portions of such a structure can block the liquid conductive adhesive flowing out from the terminals before the parts to be protected. However, the conventional wall portions cannot prevent the conductive adhesive supplied to the terminals from migrating through the wiring portion.

An object of the present invention is to provide a flexure for disk devices, which can prevent the liquid conductive adhesive supplied to the terminals from migrating through the wiring portion to locations other than the terminals.

BRIEF SUMMARY OF THE INVENTION

According to one embodiment, there is provided a flexure for disk device, comprising a metal base, a base insulation layer, a terminal, a conductive portion electrically conductive to the terminal and a detouring extending portion. The base insulation layer is formed on the metal base. The conductive portion includes a conductor formed on the base insulation layer and a cover aver which covers the conductor. A conductive adhesive is supplied to the terminal. The detouring extending portion is formed in a longitudinal middle of the conductor portion.

The detouring extending portion extends from a side surface of the conductor portion in a direction intersecting the length direction of the conductor portion along the base insulating layer. The detouring extending portion is formed integral with the conductor portion and is continuous to the side surface of the conductor portion.

According to the flexure of the embodiment, the detouring extending portion prevents the liquid conductive adhesive supplied to the terminal from migrating along the conductive portion to a location other than the terminal.

The embodiment may include a conductor parallel portion. The conductor parallel portion includes the conductor portion conductive to the terminal and a plurality of other conductor portions arranged parallel to each other. A gap is formed between each adjacent pair of conductor portions of the conductor parallel portion. The gap extends in the length direction of the conductor portions along the conductor portions. The detouring extending portion may be provided between the conductor parallel portion and the terminals.

The height of the detouring extending portion from the base insulation layer may be equal to the height of the conductor portion from the base insulation layer. One of both side surfaces of the conductor portion conductive to the terminal may be continuous to the gap in the conductor parallel portion. In that case, the detouring extending portion may extend from the one side surface of the conductor portion in a direction intersecting the length direction of the conductor portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

A flexure for a disk device according to the first embodiment will be described with reference to FIGS. 1 to 7.

Figure 1:
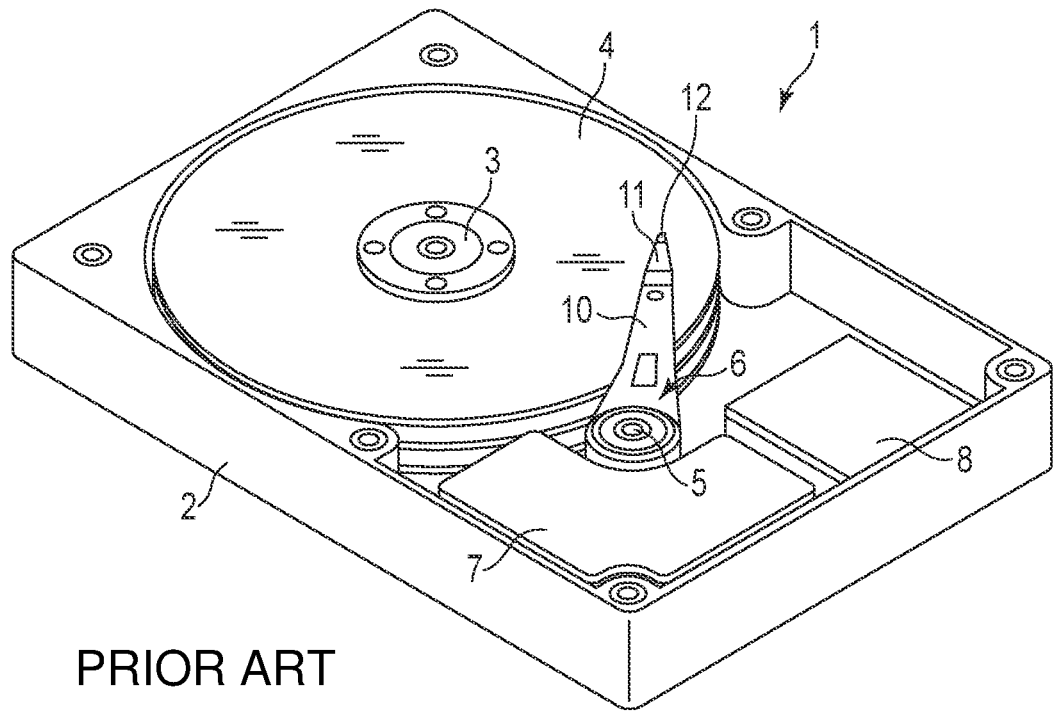
FIG. 1 is a perspective view showing an example of a disk device.

FIG. 1 is a perspective view showing a hard disk drive as an example of disk devices. A disk device 1 shown in FIG. 1 comprises a case 2, disks 4 which rotate around a spindle 3, a carriage 6 which pivots around a pivotal axis 5, a voice, coil motor 7 which drives the carriage 6, a controller 8 and the like.

On the carriage 6, an arm 10 is provided. To a distal end portion of the arm 10, a disk device suspension (to be referred to simply as "suspension", hereafter) 11 is attached. On a distal end portion of the suspension 11, a slider 12, which constitutes a magnetic head, is mounted. When the disk 4 rotates, an air bearing is formed between the disk 4 and the slider 12. When the carriage 6 is pivoted by the voice coil motor 7, the slider 12 moves to a desired track on the disk 4.

Figure 2:
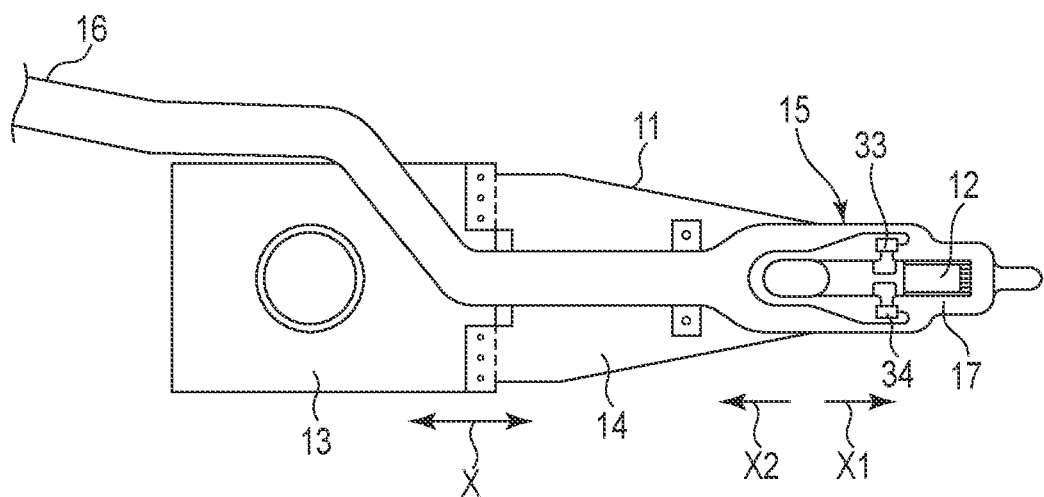
FIG. 2 is a plan view showing an example of a suspension used for the disc device.

FIG. 2 shows a plan view of an example of the suspension 11. The suspension 11 comprises a base plate 13, a load beam 14 and a flexure 15. The base plate 13 is fixed to the arm 10 (shown in FIG. 1) of the carriage 6. The directions indicated by a two-way arrow X in FIG. 2 are a length direction of the suspension 11. In this specification, the direction indicated by an arrow X1 may be referred to as a front of the suspension 11, whereas the direction indicated by an arrow X2 may be referred to as a rear of the suspension 11.

The flexure 15 is disposed along the load beam 14. The flexure 15 includes a tail portion 16 which extends behind the suspension 11. In the vicinity of the distal end of the flexure 15, a gimbal portion 17 is provided. The slider 12 is disposed on the gimbal portion 17.

Figure 3:
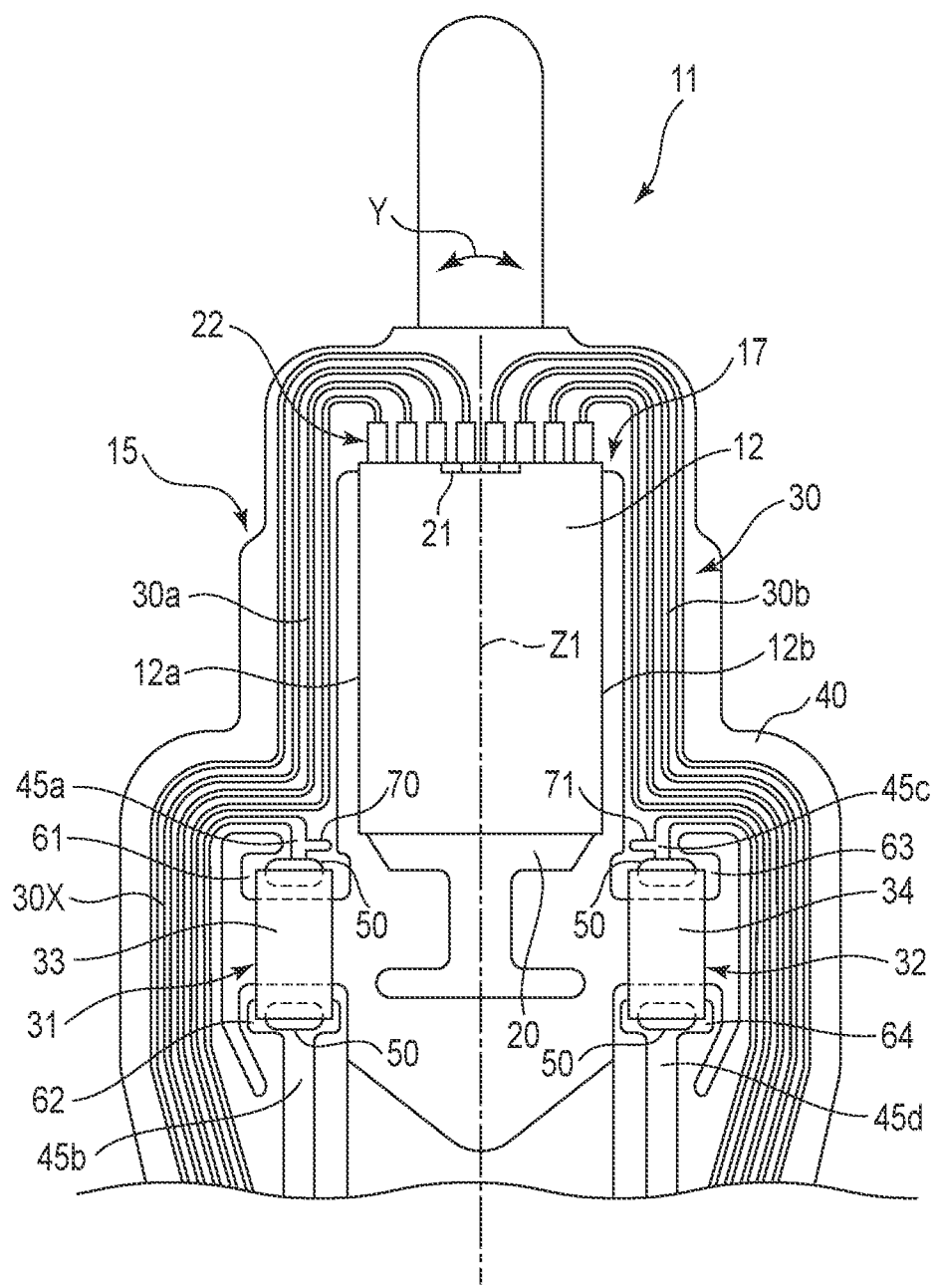
FIG. 3 is a plan view shown a portion of the flexure according to the first embodiment.

FIG. 3 shows the distal end portion of the flexure 15. The gimbal portion 17 of the flexure 15 includes a swingable tongue portion 20. The slider 12 is attached to the tongue portion 20. The slider 12 functions as a magnetic head for accessing the disk 4, such as writing and reading data with respect to the disk 4. On the end portion of the slider 12, a plurality of elements 21, such as MR elements, are provided. The elements 21 convert magnetic signals and electrical signals respectively from each other. The suspension 11 and the slider 12 constitute a head gimbal assembly. The slider 12 comprises connection terminals 22 connected to the wiring portion 30 of the flexure 15.

As shown in FIG. 3, on the gimbal portion 17, a first actuator mounting portion 31 and a second actuator mounting portion 32 are provided. A first actuator 33 is disposed on the first actuator mounting portion 31. The first actuator 33 is located near one side surface 12a of the slider 12. A second actuator 34 is disposed on the second actuator mounting portion 32. The second actuator 34 is located near the other side surface 12b of the slider 12.

The first actuator 33 and the second actuator 34 each include a piezoelectric element. The piezoelectric element is made of a piezoelectric material such as lead zirconate titanate (PZT) or the like. The first actuator 33 and the second actuator 34 each deform when a voltage is applied to the piezoelectric element. Due to this deformation, the slider 12 to move in a sway direction (indicated by two-way arrows Y in FIG. 3).

The gimbal portion 17 of the flexure 15 shown in FIG. 3 is substantially symmetrical bilaterally with a center line 31 as the axis of symmetry. The center line 31 extends in the length direction of the flexure 15. For example, the gimbal portion 17 may have a slightly different shape between the left and right sides, and the number of wires may be different between the left and right sides. The wiring portion 30 includes a first wiring portion 30a and a second wiring portion 3b. The first wiring portion 30a is located along one side surface 12a of the slider 12. The second wiring portion 30b is located along the other side surface 12b of the slider 12. Here, the first wiring portion 30a will be described mainly. The second wiring portion 30b has substantially a common configuration to that of the first wiring portion 30a.

Figure 4:
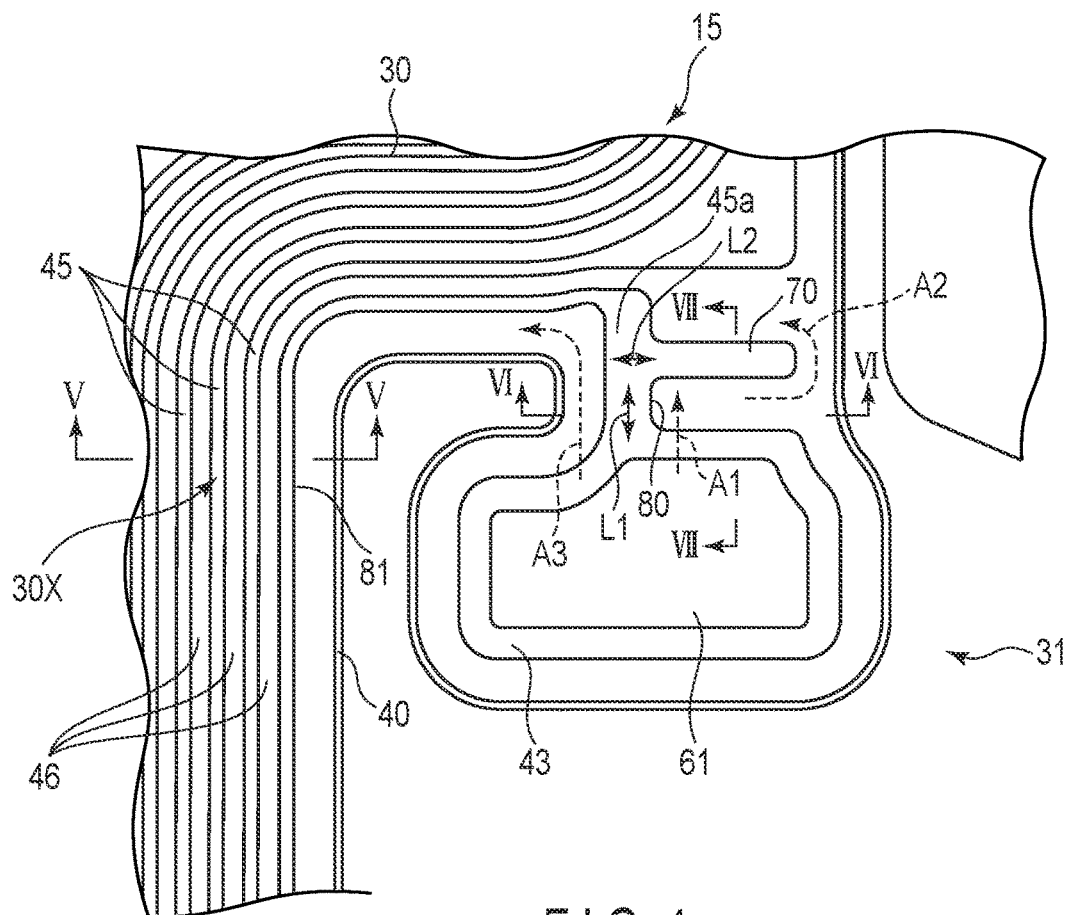
FIG. 4 is a partially enlarged plan view showing the flexure shown in FIG. 3.
Figure 5:
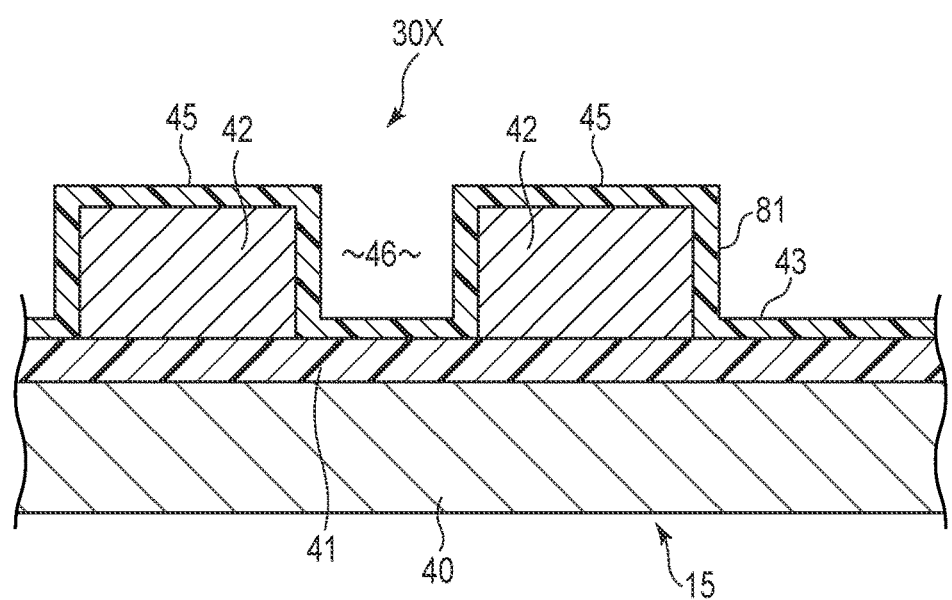
FIG. 5 is a cross-sectional view showing a wiring portion taken along line V-V in FIG. 4.

FIG. 4 is a partial enlarged plan view of the wiring portion 30 of the flexure 15 shown in FIG. 3 FIG. 5 is a cross-section view of a part of the wiring portion 30 taken along line V-V in FIG. 4. As shown in FIG. 5, the wiring portion 30 comprises a metal base 40, a base insulating layer 41, a plurality of conductors 42, and a cover layer 43 which covers the conductors 42. The metal base 40 is formed from a thin stainless steel plate. The base insulating layer 41 is formed on the metal base 40. The conductors 42 are arranged along the base insulation layer 41. The metal base 40 forms the main body of the flexure 15 and can deform elastically along the thickness direction.

The conductor 4 is made of a metal with low electrical resistance, for example, copper. The base insulating layer 41 and the cover layer 43 are each made of an electrically insulating resin, such as polyimide. The thickness of the base insulating layer 41 is, for example, 5 to 20 µm. The thickness of the conductors 42 is, for example, 4 to 16 µm. The thickness of the cover layer 43 is, for example, 2 to 10 µm. The conductors 42 and the cover layer 43 constitute a conductor portion 45.

As shown in FIGS. 4 and 5, the wiring portion 30 includes a conductor parallel portion 30X. The conductor parallel portion 30X includes a plurality of conductor portions 45 arranged parallel to each other. The conductor parallel portion 30X comprises gaps 46. The gaps 46 are each formed between each adjacent pair of conductor portions 45. The gaps 46 extend along the length direction of the conductor portions 45. When a liquid conductive adhesive 50 enters gaps 46, the conductive adhesive 50 migrates by capillary action. The liquid conductive adhesive 50 that enters the gap 46 may migrate along the gaps 46 to an unexpected location.

The conductive adhesive 50 contains a conductive material (conductive particles) such as silver particles. The conductive particles contained in the conductive adhesive 50 may migrate through the conductive section 45. The migrating conductive particles may detach from the wiring portion 30 for some reason. The conductive particles that detached from the wiring portion 30 may cause a failure in the disk device. For this reason, in this embodiment, the first wiring portion 30a and the second wiring portion 30b are provided with detouring extending portions 70 and 71. The migration of the conductive adhesive 50 can be inhibited by the detouring extending portions 70 and 71. The detouring extending portions 70 and 71 will be described in detail later.

As shown in FIG. 3, the first actuator mounting portion 31 includes a first terminal 61 and a second terminal 62 formed thereon. One end of the first actuator 33 is fixed to the first terminal 61 by the conductive adhesive 50. The first terminal 61 is electrically conductive to the first conductive portion 45a. The other end of the first actuator 33 is fixed to the second terminal 62 by the conductive adhesive 50. The second terminal 62 is electrically conductive to the second conductor portion 45b.

The second actuator mounting portion 32 includes a third terminal 63 and a fourth terminal 64 formed therein. To the third terminal 63, one end of the second actuator 34 is fixed by the conductive adhesive 50. The third terminal 63 is electrically conductive to the third conductor 45c. The other end of the second actuator 34 is fixed to the four terminal 64 by the conductive adhesive 50. The fourth terminal 64 is electrically conductive to the fourth conductor portion 45d.

The first actuator-mounted portion 31 and the second actuator-mounted portion 32 are substantially symmetrical bilaterally with an imaginary center line Z1 as the axis of symmetry. The configurations of the actuator mounting portions 31 and 32 are substantially common. Therefore, the first actuator mounting portion 31 will be described as representative hereafter.

Figure 6:
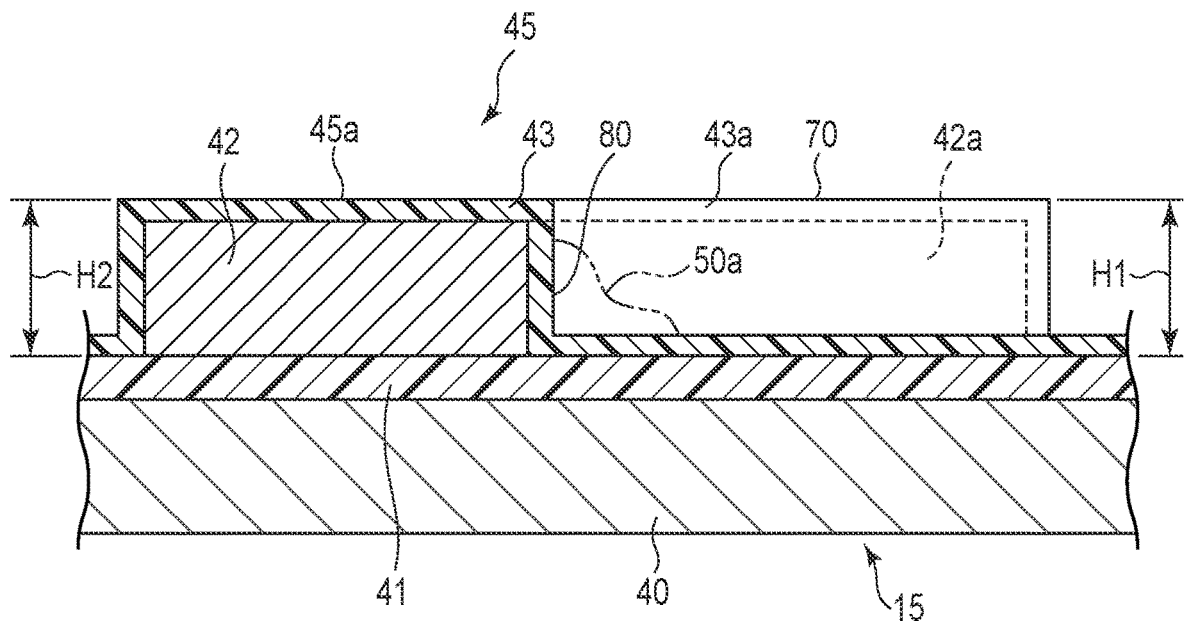
FIG. 6 is a cross-sectional view of the wiring portion taken along line VI-VI in FIG. 4.
Figure 7:
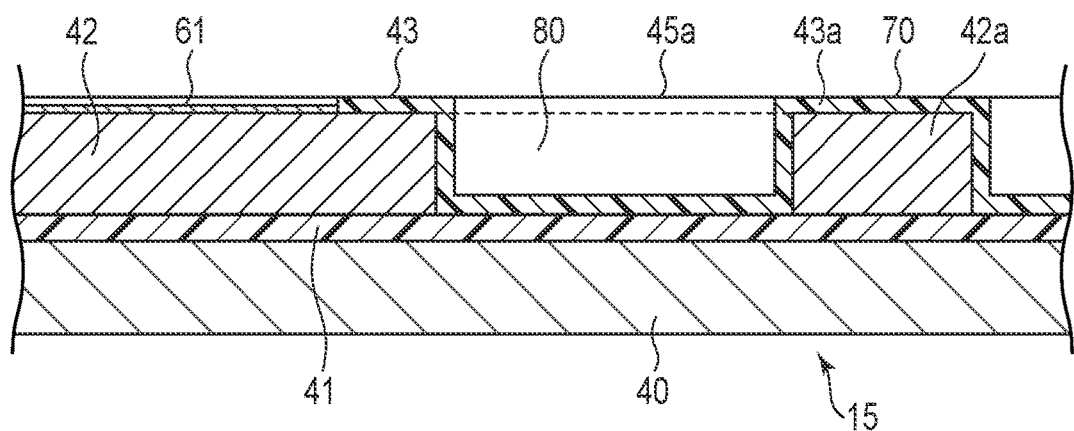
FIG. 7 is a cross-sectional view of the wiring portion taken along line VII-VII in FIG. 4.

As shown in FIG. 4, a detouring extending portion 70 is formed in the first conductor portion 45a. The first conductor portion 45a forms a part of the wiring portion 30. The detouring extending portion 70 is formed in the vicinity of the first terminal 61. The two-way arrow L1 shown in FIG. 4 indicates the length direction of the first conductor portion 45a. The tow way arrow L1 indicates the width direction of the first conductor portion 45a. FIG. 6 is a cross-sectional view of a part of the wiring portion 30 taken along line VI-VI in FIG. 4. FIG. 7 is a cross-sectional view of a part of the wiring portion 30 taken along line VII-VII in FIG. 4.

The detouring extending portion 70 is formed between the first terminal 61 and the conductor parallel portion 30X. The detouring extending portion 70 is formed in a longitudinal middle of the first conductor portion 45a. The detouring extending portion 70 protrudes in the width direction of the first conductor portion 45a as a cape. The detouring extending portion 70 extends along a direction that intersects the length direction of the first conductor portion 45a. For example, the detouring extending portion 70 extends in a direction perpendicular to the length direction of the first conductor portion 45a. The detouring extending portion 70 is integral with the first conductor 45a. The detouring extending portion 70 includes a conductor 42a made of copper and a cover layer 43a which covers the conductor 42a.

The conductor 42a of the detouring extending portion 70 is made of copper, which is common to the conductor 42 of the first conductor portion 45a. The detouring extending portion 70 is formed to be integrated with the first conductor portion 45a at the same time when the first conductor portion 45a is formed. Therefore, no special manufacturing process to form the detouring extending portion 70 is required.

As shown in FIG. 6, the height (the height from the base insulating layer 41) of the detouring extending portion 70 is denoted by H1. The height of the first conductor portion 45a (the height from the base insulating layer 41) is denoted by H2. H1 and H2 are equal to each other. The detouring extending portion 70 is formed to be integrated with the first conductor portion 45a. The detouring extending portion 70 is continuous from the first conductor portion 45a in the width direction of the first conductor portion 45a.

The liquid conductive adhesive 50 (shown in FIG. 3) is supplied to the first terminal 61. A portion of the liquid conductive adhesive 50 supplied to the terminal 61 may flow in the direction indicated by the first arrow A1 shown in FIG. 4. The liquid conductive adhesive 50 may not flow out immediately after the conductive adhesive 50 is applied. However, the liquid conductive adhesive 50 may overflow and flow out when the actuators 33 and 34 are mounted. For example, as shown by a two dotted line 50a in FIG. 6, it is considered that the conductive adhesive 50 may adhere to a corner portion formed by a side surface 80 of the first conductive portion 45a and the base insulating layer 41.

The conductive adhesive (indicated by the two-dot chain line 50a) adhering to the corner portion (the corner portion made by the side surface 80 and the base insulating layer 41) may flow in the direction of the first arrow A1 shown in FIG. 4. However, the flow of the conductive adhesive 50 flowing in the direction of the first arrow A1 is blocked by the detouring extending portion 70. As a result, the conductive adhesive 50 flows around the detouring extending portion 70 as shown by the second arrow A2 (shown in FIG. 4). Thus, the path of migration of the conductive adhesive 50 becomes longer according to the detouring extending portion 70. Therefore, is possible to suppress the conductive adhesive 50 from reaching the conductor parallel portion 30X.

If the conductive adhesive supplied to the terminal 61 flows in the direction of the third arrow A3 (shown in FIG. 4), the conductive adhesive may migrate toward the conductor parallel portion 30X. However, the side surface 81 of conductor parallel portion 30X does not comprise gaps 46. Thus, it is possible to avoid the conductive adhesive 50 from flowing through the conductor parallel portion 30X by capillary action.

The above-provided descriptions are directed to the detouring extending portion 70 formed in the first wiring portion 30a. The detouring extending portion 71 provided in the second wiring portion 30b is similar to the detouring extending portion 70 provided in the first wiring portion 30a, and therefore the descriptions of the other extending portion 71 will be omitted.

Second to Sixth Embodiments

Flexures 15A to 15E of the second to sixth embodiments will be described with reference to FIGS. 8 to 12. In the flexures 15A to 15E, parts in common with those of the flexure 15 of the first embodiment will be denoted by the common reference symbols, and the descriptions thereof will be omitted.

Figure 8:
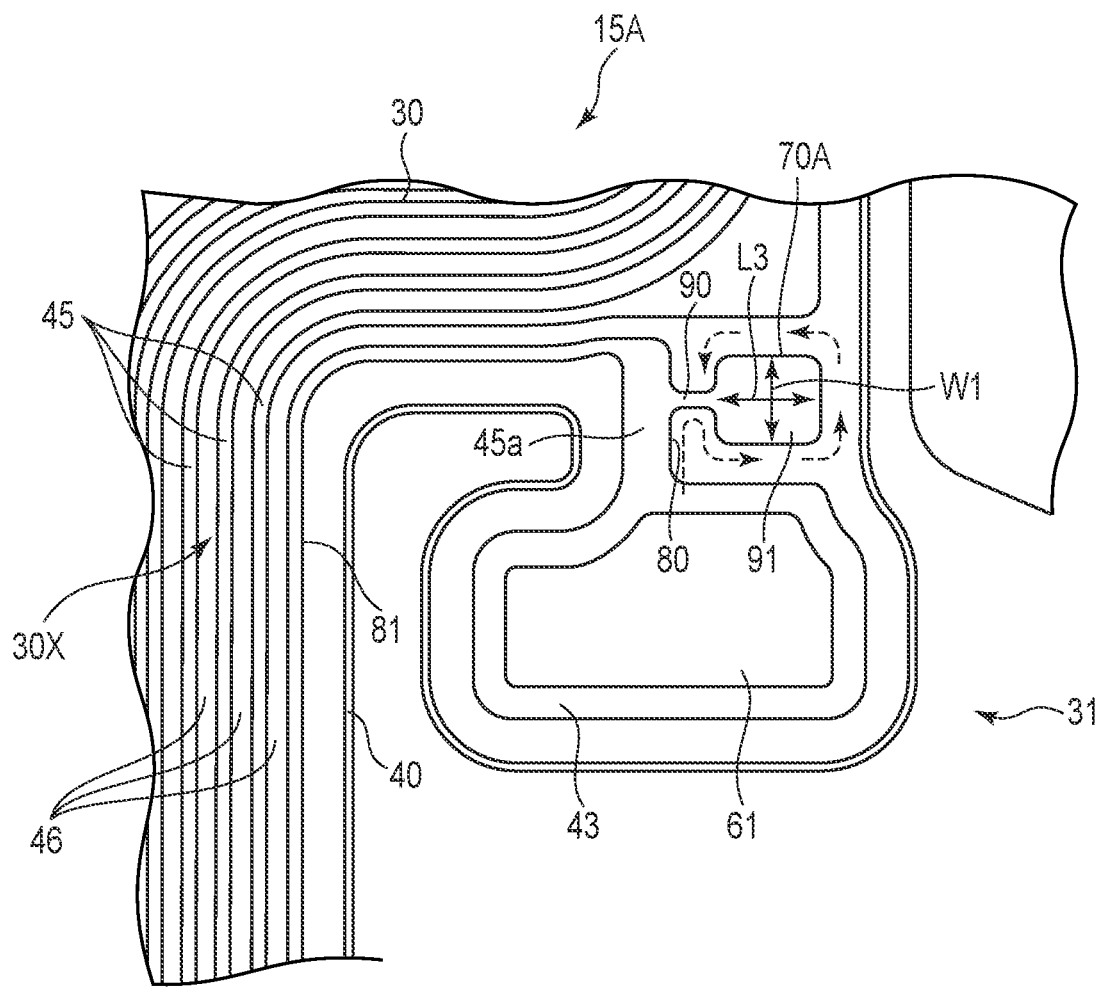
FIG. 8 is a plan view of a portion of a flexure according to the second embodiment.

FIG. 8 is a plan view showing a part of a flexure 15A of the second embodiment. The wiring portion 30 of the flexure 15A includes a detouring extending portion 70A that has a detouring distance greater than that of the detouring extending portion 70 of the first embodiment. The detouring extending portion 70A includes a neck portion 90 and a wide portion 91. The neck portion 90 is continuous to the side surface 80 of the first conductor portion 45a. The wide portion 91 is continuous to the neck portion 90. The width W1 of the wide portion 91 is greater than the width of the neck portion 90. The length L3 of the wide portion 91 is greater than the length of the neck portion 90. As indicated by the dashed arrow in FIG. 8, the conductive adhesive flowing out of the terminal 61 detours along the surrounding of the wide portion 91.

Figure 9:
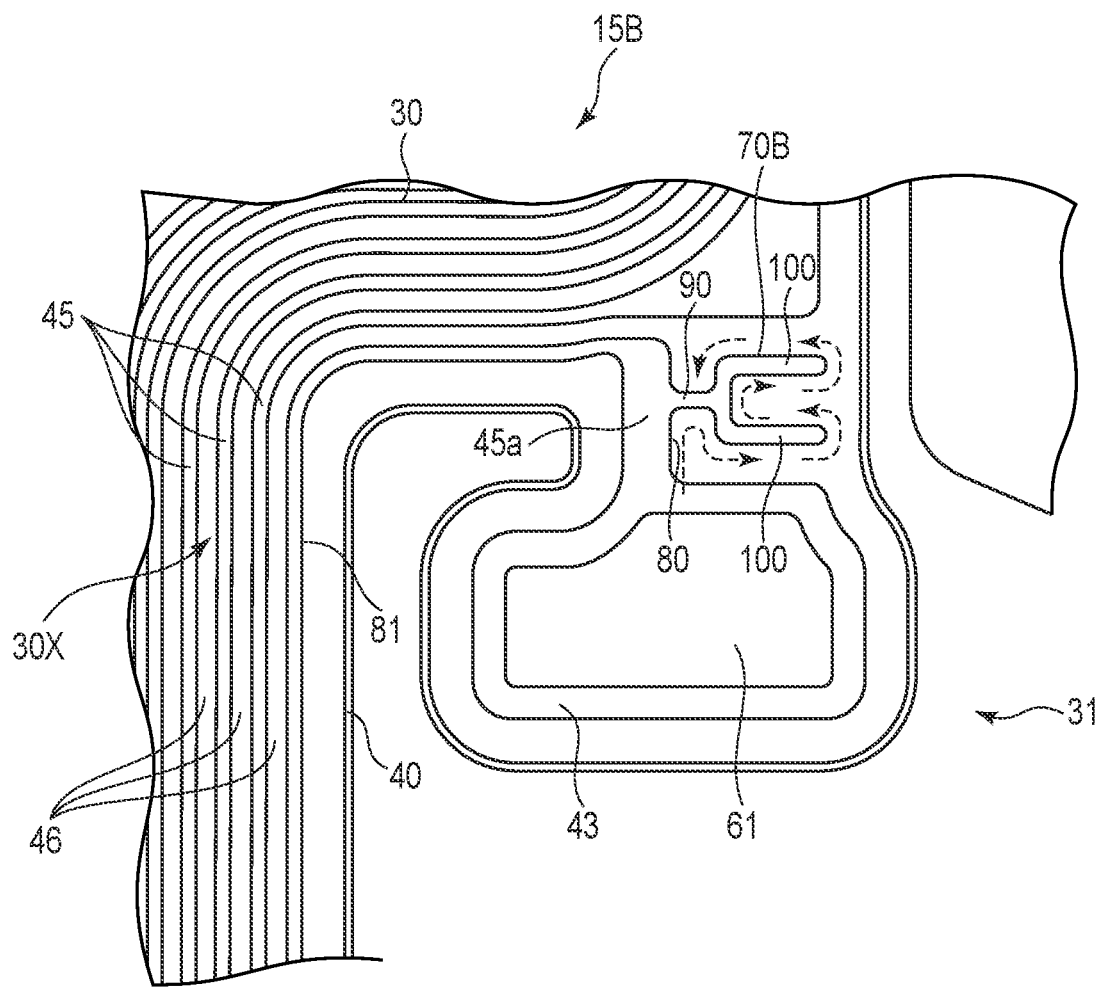
FIG. 9 is a plan view of a portion of a flexure according to the third embodiment.

FIG. 9 is a plan view showing a part of a flexure 15B of the third embodiment. The detouring extending portion 70B of this flexure 15B includes a neck portion 90 and a plurality of fork-shaped convex portions 100 to further increase the detouring distance of the conductive adhesive. The neck portion 90 is continuous to the side surface 80 of the first conductor portion 45a. The fork-shaped convex portions 100 are continuous to the neck portion 90. As indicated by the dashed arrows in FIG. 9, the conductive adhesive flowing out of the terminal 61 largely detours along the surrounding of the plurality of convex portions 100.

Figure 10:
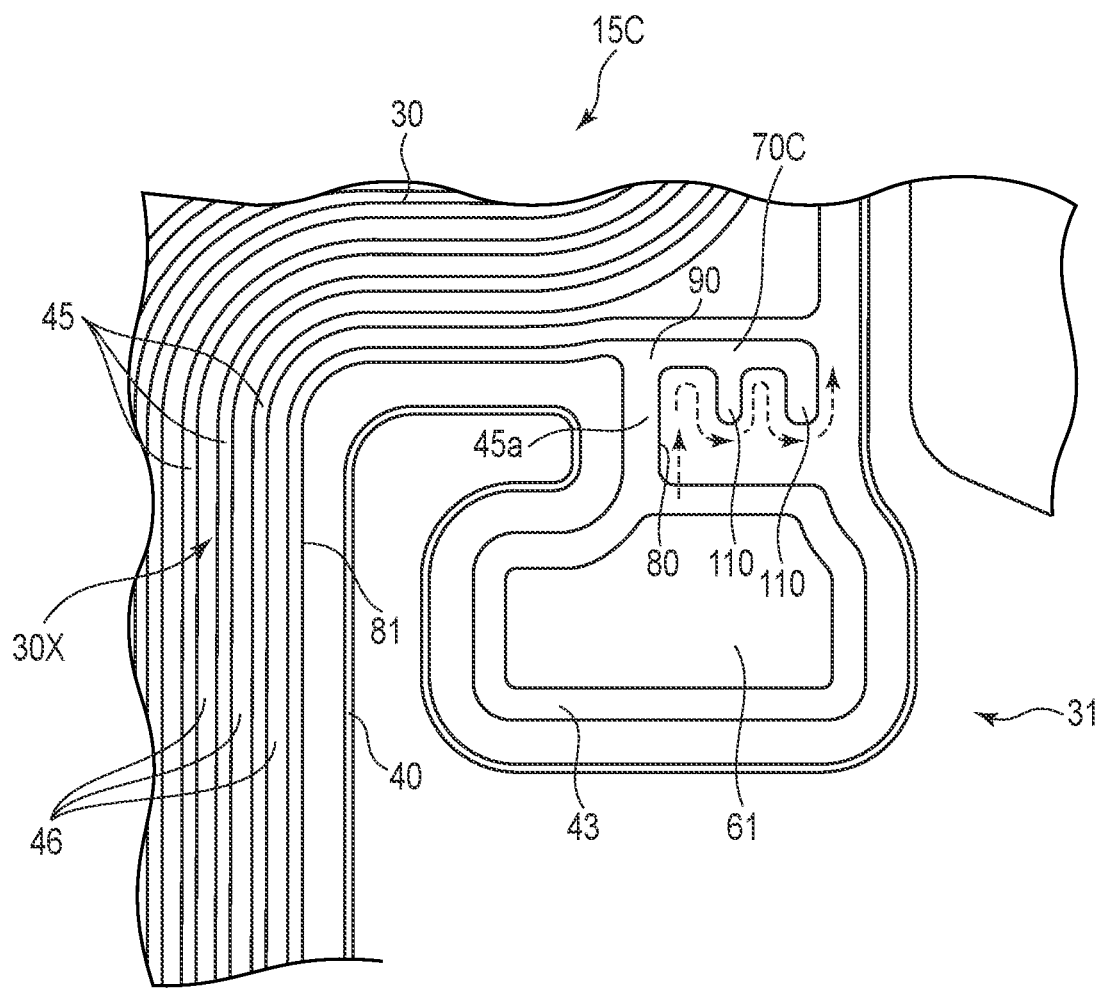
FIG. 10 is a plan view of a portion of a flexure according to the fourth embodiment.

FIG. 10 is a plan view showing a part of a flexure 15C of the fourth embodiment. The detouring extending portion 70C of this flexure 15O includes a neck portion 90 and a plurality of convex portions 110. The neck portion 90 is continuous to the side surface 80 of the first conductor 45a. The plurality of convex portions 110 are continuous, to the neck portion 90. Further, the convex portions 110 extend in the direction opposing the terminal 61. As indicated by the dashed arrows in FIG. 10, the conductive adhesive flowing out of the terminal 61 detours along the surrounding of the convex portions 110 opposing the terminal 61.

Figure 11:
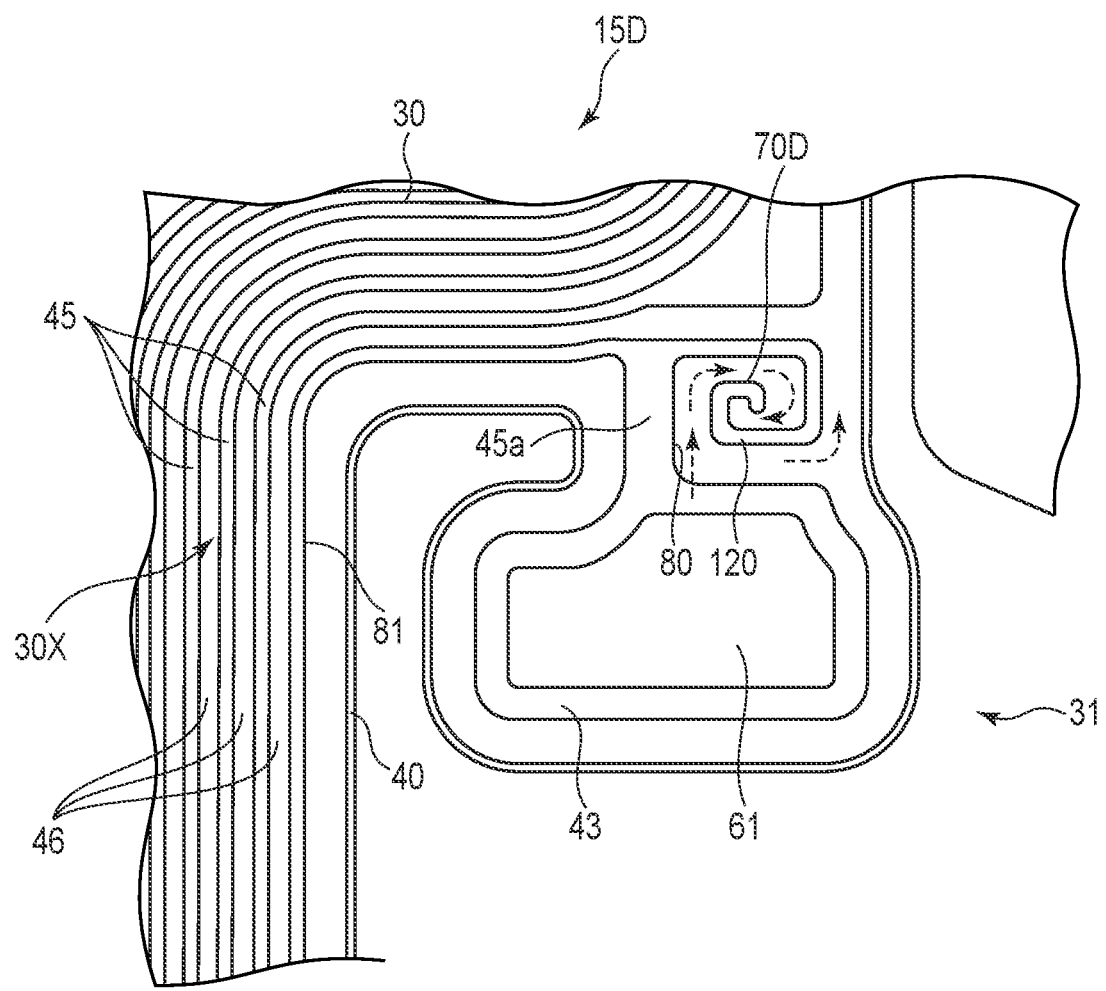
FIG. 11 is a plan view of a portion of a flexure according to the fifth embodiment.

FIG. 11 is a plan view showing a part of a flexure 15D of the fifth embodiment. The extending portion 70D of the flexure 15D includes a spiral-shaped convex portion 120 to further increase the detouring distance. The spiral-shaped convex portion 120 is continuous to the side surface 80 of the first conductor portion 45a. As indicated by the dashed arrows in FIG. 11, the conductive adhesive flowing out of the terminal 61 largely detours along the spiral-shaped convex portion 120.

Figure 12:
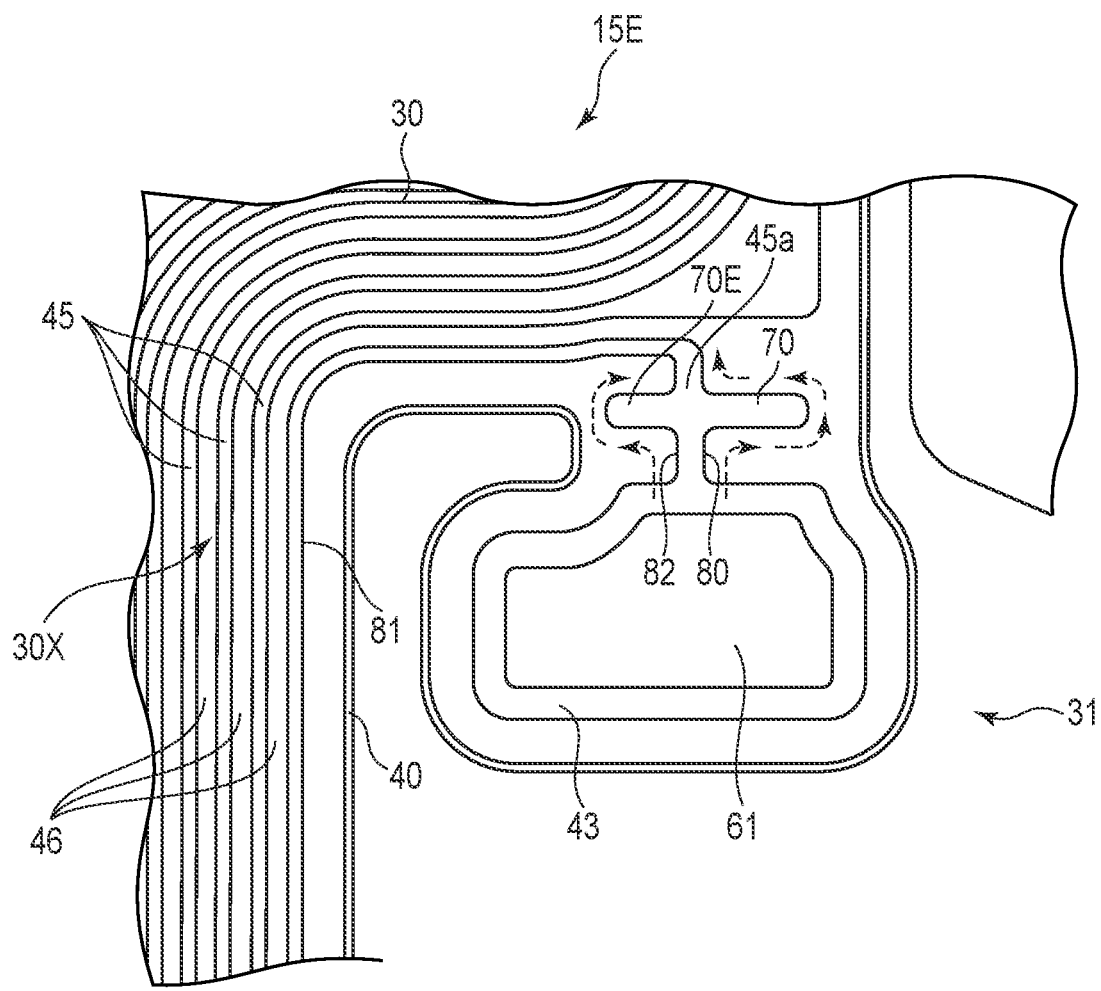
FIG. 12 is a plan view of a portion of a flexure according to the sixth embodiment.

FIG. 12 is a plan view showing a part of a flexure 15E of the sixth embodiment. The flexure 15E includes a first detouring extending portion 70 and a second detouring extending portion 70E. The first detouring extending portion 70 is continuous to one side surface 80 of the conductor portion 45a as in the case of the detouring extending portion 70 of the first embodiment (FIGS. 3 to 7). The second detouring extending portion 70E is continuous to the other side surface 82 of the conductor 45a.

The flexure 15E shown in FIG. 12 includes a first detouring extending portion 70 and a second detouring extending portion 70E. One side surface 80 of the conductor portion 45a is continuous to the first detouring extending portion 70. The other side surface 82 of the conductor portion 45a is continuous to a side surface 81 of the conductor parallel portion 30X via the second detouring extending portion 70E. With this structure, the conductive adhesive adhering to the other side surface 82 of the conductor portion 45a cannot migrate to the side surface 81 of the conductor parallel portion 30X by capillary action. However, depending on the specifications of the suspension, the conductor portion 45a may be placed between some other wiring portions. Even in such a case, the second detouring extending portion 70E can prevents the conductive adhesive from migrating. For example, the conductive adhesive adhering to the other side surface 82 of the conductor portion 45a can prevent the conductive adhesive from migrating through the conductor portion 45a to another wiring portion that is separated from the terminal 61. In other words, it is effective to provide the first detouring extending portion 70 on one side surface 80 of the conductor portion 45a and the second detouring extending portion 70E on the other side surface 82 of the conductor 45a.

As discussed above, in the example shown in FIG. 4, the detouring extending portion may extend from the one side surface of the conductor portion in a direction perpendicular to the length direction of the conductor portion. In the example shown in FIG. 8, the detouring extending portion may include a neck portion and a wide portion, with the neck portion being continuous to the side surface of the conductor portion, and the wide portion being continuous to the neck portion and having a width greater than that of the neck portion. In the example shown in FIG. 9, the detouring extending portion may include a neck portion and a plurality of fork-shaped convex portions, with the neck portion being continuous to the side surface of the conductor portion, and the fork-shaped convex portions being continuous to the neck portion. In the example shown in FIG. 10, the detouring extending portion may include a neck portion and a plurality of convex portions, with the neck portion being continuous to the side surface of the conductor portion, and the convex portions being continuous to the neck portion and extending in a direction opposing the terminal. In the example shown in FIG. 11, the detouring extending portion may have a spiral-shaped convex portion, with the spiral-shaped convex portion being continuous to the side surface of the conductor portion. And in the example shown in FIG. 12, the portion may include a first detouring extending portion and a second detouring extending portion, with the first detouring extending portion being continuous to one side surface of the conductor portion conductive to the terminal, and the second detouring extending portion being continuous to the other side surface of the conductor portion.

When implementing the present invention, it is only natural that the specific configurations of the metal base, wiring portions, terminals and the like, which constitute the flexure can be changed in various ways. The embodiments of the present invention can as well be applied to suspensions that do not have actuator-mounted portions. The embodiments of the present invention can be applied to a terminal to which a conductive adhesive is supplied and a wiring portion including a conductor portion connected to this terminal.

Additional advantages and modifications will readily occur to those skilled in the art. Therefore, the invention in its broader aspects is not limited to the specific details and representative embodiments shown and described herein. Accordingly, various modifications may be made without departing from the spirit or score of the general inventive concept as defined by the appended claims and their equivalents.

What is claimed is:

1. A flexure for a disk device, the flexure comprising:
a metal base;
a base insulating layer formed on the metal base;
a conductor parallel portion comprising a plurality of conductor portions arranged parallel to each other, each of the conductor portions including a conductor formed on the base insulating layer and a cover layer which covers the conductor;
a first conductor portion comprising the conductor and the cover layer, the first conductor portion being continuous with an outside conductor portion from among the conductor portions of the conductor parallel portion and extending in a direction apart from the conductor parallel portion;
a terminal electrically conductive to the conductor of the first conductor portion, to which a conductive adhesive is supplied; and
a detouring extending portion formed in a longitudinal middle of the first conductor portion, the detouring extending portion being provided apart from the conductor parallel portion and in a vicinity of the terminal, the detouring extending portion comprising a first conductor which is integral with the conductor of the first conductor portion and a first cover layer which is integral with the cover layer of the first conductor portion, and the detouring extending portion extending from a first side surface of the first conductor portion in a direction intersecting a length direction of the first conductor portion along the base insulation layer and being continuous with the first side surface of the first conductor portion.

2. The flexure of claim 1, wherein:
a gap is provided between each adjacent pair of conductors of the conductor parallel portions and extending in the length direction of the conductors along the conductors, and
the detouring extending portion is provided between the conductor parallel portion and the terminal.

3. The flexure of claim 1, wherein a height of the detouring extending portion from the base insulating layer is equal to a height of the first conductor portion from the base insulating layer.

4. The flexure of claim 2, wherein the first side surface of the first conductor portion, which is conductive to the terminal, is continuous with the gap.

5. The flexure of claim 4, wherein the detouring extending portion extends from the first side surface of the first conductor portion in a direction perpendicular to the length direction of the first conductor portion.

6. The flexure of claim 1, wherein the detouring extending portion includes a neck portion continuous with the first side surface of the first conductor portion and a wide portion continuous with the neck portion and having a width greater than a width of the neck portion.

7. The flexure of claim 1, wherein the detouring extending portion includes a neck portion continuous with the first side surface of the first conductor portion and a plurality of fork-shaped convex portions continuous with the neck portion.

8. The flexure of claim 1, wherein the detouring extending portion includes a neck portion connected with the first side surface of the first conductor portion and a plurality of convex portions continuous with the neck portion and extending in a direction opposing to the terminal.

9. The flexure of claim 1, wherein the detouring extending portion includes a spiral-shaped convex portion continuous with the first side surface of the first conductor portion.

10. The flexure of claim 4, further comprising a second detouring extending portion extending from a second side surface of the first conductor portion in a direction intersecting the length direction of the first conductor portion.

* * * * *